United States Patent
Choi

(10) Patent No.: US 11,682,512 B2
(45) Date of Patent: Jun. 20, 2023

(54) INNER PLUNGER OF SOLENOID ASSEMBLY FOR DIFFERENTIAL CLUTCH OF VEHICLE AND MANUFACTURING METHOD THEREOF

(71) Applicant: Byoung Sun Choi, Daegu (KR)

(72) Inventor: Byoung Sun Choi, Daegu (KR)

( * ) Notice: Subject to any disclaimer, the term of this patent is extended or adjusted under 35 U.S.C. 154(b) by 77 days.

(21) Appl. No.: 17/181,461

(22) Filed: Feb. 22, 2021

(65) Prior Publication Data

US 2022/0270800 A1 Aug. 25, 2022

(51) Int. Cl.
| H01F 7/16 | (2006.01) |
| H01F 7/08 | (2006.01) |
| F16H 48/34 | (2012.01) |
| F16H 48/24 | (2006.01) |

(52) U.S. Cl.
CPC ........... *H01F 7/1607* (2013.01); *F16H 48/24* (2013.01); *F16H 48/34* (2013.01); *H01F 7/081* (2013.01)

(58) Field of Classification Search
CPC ........ H01F 7/081; H01F 7/1607; F16H 48/24; F16H 48/34; F16D 27/118
See application file for complete search history.

(56) References Cited

U.S. PATENT DOCUMENTS

| 3,854,562 | A | * | 12/1974 | Wilczewski | .......... | F16D 27/112 |
| | | | | | | 192/84.961 |
| 4,271,722 | A | | 6/1981 | Cambell | | |
| 4,281,264 | A | * | 7/1981 | Keim | ........... | H02K 3/47 |
| | | | | | | 174/DIG. 20 |
| 6,129,194 | A | * | 10/2000 | Booth | ........... | F16D 27/112 |
| | | | | | | 192/84.961 |
| 6,194,803 | B1 | * | 2/2001 | Heim | ........... | F16D 27/112 |
| | | | | | | 192/84.941 |
| 6,945,895 | B2 | * | 9/2005 | Fusegi | ........... | F16H 48/08 |
| | | | | | | 192/84.92 |
| 7,284,978 | B2 | * | 10/2007 | Manda | ........... | B29C 45/52 |
| | | | | | | 251/297 |
| 7,887,450 | B2 | * | 2/2011 | Fusegi | ........... | F16H 48/34 |
| | | | | | | 192/84.96 |
| 8,808,127 | B2 | * | 8/2014 | Seidl | ........... | F16D 11/00 |
| | | | | | | 475/231 |
| 9,396,860 | B1 | * | 7/2016 | Wright | ........... | F16D 27/118 |
| 9,601,252 | B2 | * | 3/2017 | Irie | ........... | H01F 7/127 |
| 10,995,803 | B2 | * | 5/2021 | Moore | ........... | F16D 27/102 |
| 2016/0245345 | A1 | * | 8/2016 | Miki | ........... | F16D 13/76 |

FOREIGN PATENT DOCUMENTS

KR 101660641 9/2016

\* cited by examiner

*Primary Examiner* — Matthew W Jellett
(74) *Attorney, Agent, or Firm* — IPLA P.A.

(57) ABSTRACT

An inner plunger of a solenoid coil assembly for a differential clutch of a vehicle contributes to weight lightening and price reduction of a solenoid assembly, provide various shapes, reduce friction against an inner housing, and improve the function of the solenoid assembly. The inner plunger includes an outer wheel combined with a coil bobbin of a solenoid assembly and an inner wheel combined with an inner housing. The inner wheel is molded of insulator synthetic resin with excellent moldability, magnetic metal as the outer wheel is inserted into the outer circumferential surface of the inner wheel made of the synthetic resin, and an undercut groove is formed on the whole inner surface of the inner wheel made of synthetic resin in order to reduce friction against an inner housing.

2 Claims, 5 Drawing Sheets

INNER PLUNGER OF SOLENOID ASSEMBLY FOR DIFFERENTIAL CLUTCH OF VEHICLE AND MANUFACTURING METHOD THEREOF

BACKGROUND

The present invention relates to an inner plunger of a solenoid coil assembly for a differential clutch of a vehicle and a manufacturing method thereof, and more particularly, to an inner plunger of a solenoid coil assembly for a differential clutch of a vehicle and a manufacturing method thereof, which can improve quality and productivity and lighten weight.

As is well known, a differential of a vehicle is configured to differentially distribute the driving force of an engine according to resistance applied to both wheels, and a differential case is rotatably installed inside a carrier. A spyder having a pinion and side gears geared at both sides of the pinion are installed inside the differential case, and the side gears and hubs of the wheels are connected to a drive shaft, so that engine power is transmitted.

A solenoid assembly functioning to operate a clutch of the differential of the vehicle actuates an outer plunger and an inner plunger or a piston using a magnetic force generated from a coil assembly therein in order to connect or separate a differential gear locking device.

Now, a configuration of the conventional inner plunger constituting the solenoid assembly for the differential clutch having the above-mentioned action will be described. An inner wheel of the inner plunger closely meshed to an inner housing is made of stainless steel to move regardless of the magnetic force, and an outer wheel is made of magnetic metal to form an electromagnetic force of a coil.

In order to prevent an influence of the magnetic force on the inner wheel and to form the magnetic force on the outer wheel, different metals are welded together, and the welded metals are processed precisely through a precision machining process with various steps, so a manufacturing price is expensive.

Especially, since the inner wheel and the outer wheel of the inner plunger are all made of metal, the inner plunger is very heavy.

Therefore, the conventional inner plunger has several disadvantages in that it goes against weight reduction of vehicles and deteriorates the function of the solenoid assembly, and in that there are many problems in the structure of the inner plunger since the inner plunger is limited in its shape due to a bad moldability if it is made of stainless steel.

Korean Patent Publication No. 10-1983-0003671 (published on Jun. 22, 1983)

Korean Patent No. 10-1660641 (registered on Sep. 21, 2016)

SUMMARY OF THE INVENTION

Accordingly, the present invention has been made to solve the above-mentioned problems occurring in the prior arts, and it is an object of the present invention to provide an inner plunger of a solenoid coil assembly for a differential clutch of a vehicle, which can contribute to weight lightening and price reduction of a solenoid assembly, provide various shapes, and improve the function of the solenoid assembly by reducing friction against an inner housing.

To accomplish the above object, according to the present invention, there is provided an inner plunger of a solenoid coil assembly for a differential clutch of a vehicle including an outer wheel combined with a coil bobbin of a solenoid assembly and an inner wheel combined with an inner housing.

The inner wheel of the inner plunger is molded with insulator synthetic resin with excellent moldability, and magnetic metal as the outer wheel is inserted into the outer circumferential surface of the inner wheel made of the synthetic resin.

An undercut groove is formed in the whole inner surface of the inner wheel in order to reduce friction against an inner housing.

In another aspect of the present invention, there is provided a manufacturing method of an inner plunger of a solenoid assembly for a clutch including the step of preparing a mold, which has a space for inserting an outer wheel of the inner plunger and a space for forming an inner wheel, and a core, which has an undercut molding part for forming the undercut groove on the whole inner surface of the inner wheel in order to reduce friction against the inner housing.

The manufacturing method of an inner plunger further includes the steps of: putting an outer wheel made of magnetic metal in the space of the mold for inserting the outer wheel of the inner plunger; combining the core having the undercut molding part with the middle of the mold; and forming the inner wheel with nonmagnetic synthetic resin by injection-molding.

The inner plunger constituting the solenoid assembly according to the present invention can contribute improvement of productivity and price reduction of the solenoid since having the inner wheel made of synthetic resin and the outer wheel made of magnetic metal.

Moreover, the inner plunger according to the present invention can provide various shapes of the inner plunger and reduce weight since the inner wheel is injection-molded, and improve the quality of the solenoid assembly since reducing a friction force against the inner housing.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Hereinafter, example embodiments of an inner plunger and a manufacturing method thereof according to the present invention will be described in detail, and the example embodiments of the present invention are to realize the present invention. It should be understood, however, that the example embodiments of the present invention do not limit the technical idea of the present invention, but are to cover all modifications, equivalents, and alternatives falling within the technical idea and scope of the present invention.

Furthermore, even though actions and effects obtained by the components of the present invention are not explicitly described, it is natural that predictable effects obtained by the components of the present invention belong to the technical scope of the present invention.

With reference to the attached drawings, an inner plunger of a solenoid coil assembly for a differential clutch of a vehicle according to the present invention will be described in detail.

Figure 1:
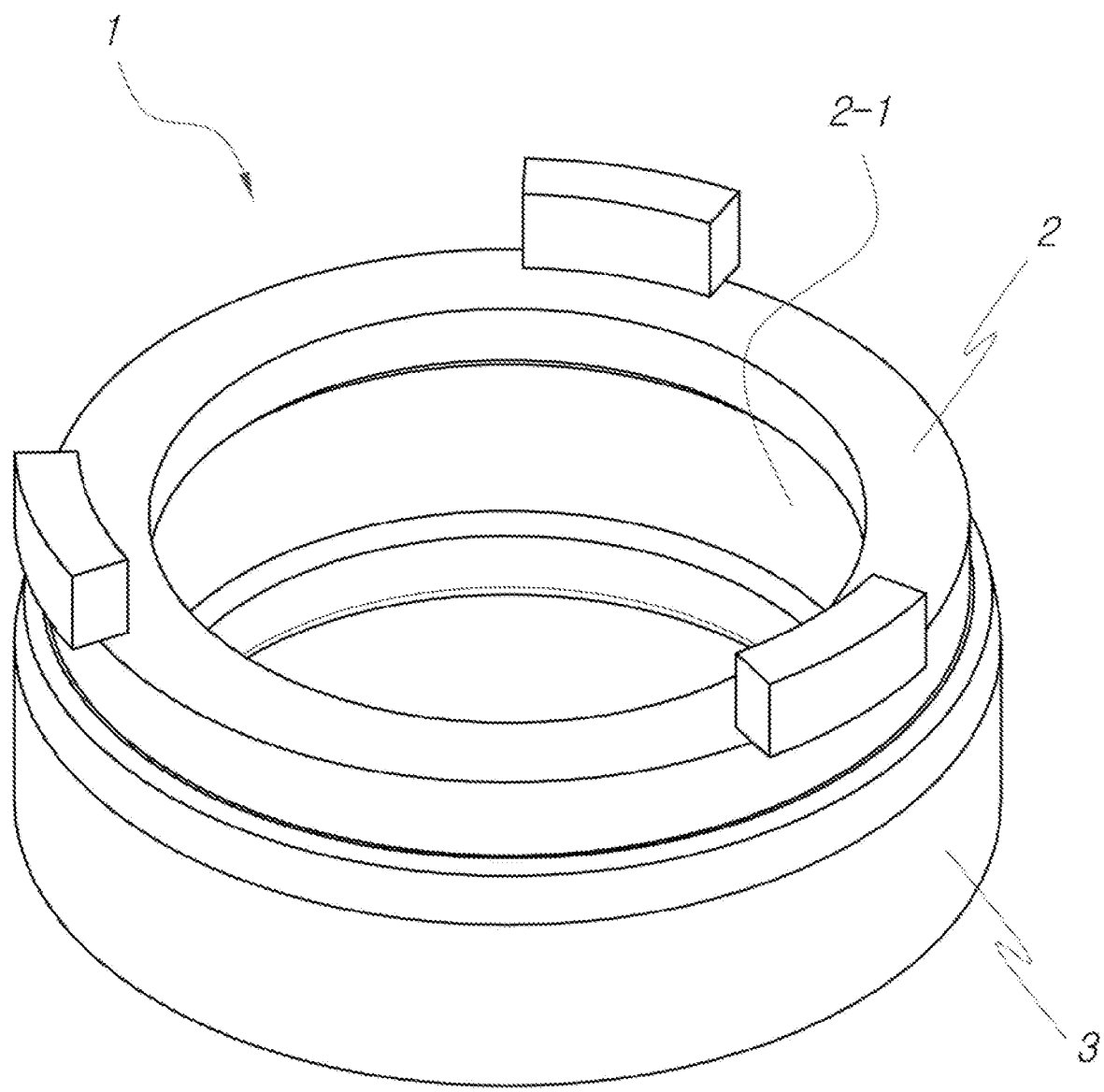
FIG. 1 is a perspective view showing an inner plunger according to the present invention.
Figure 2:
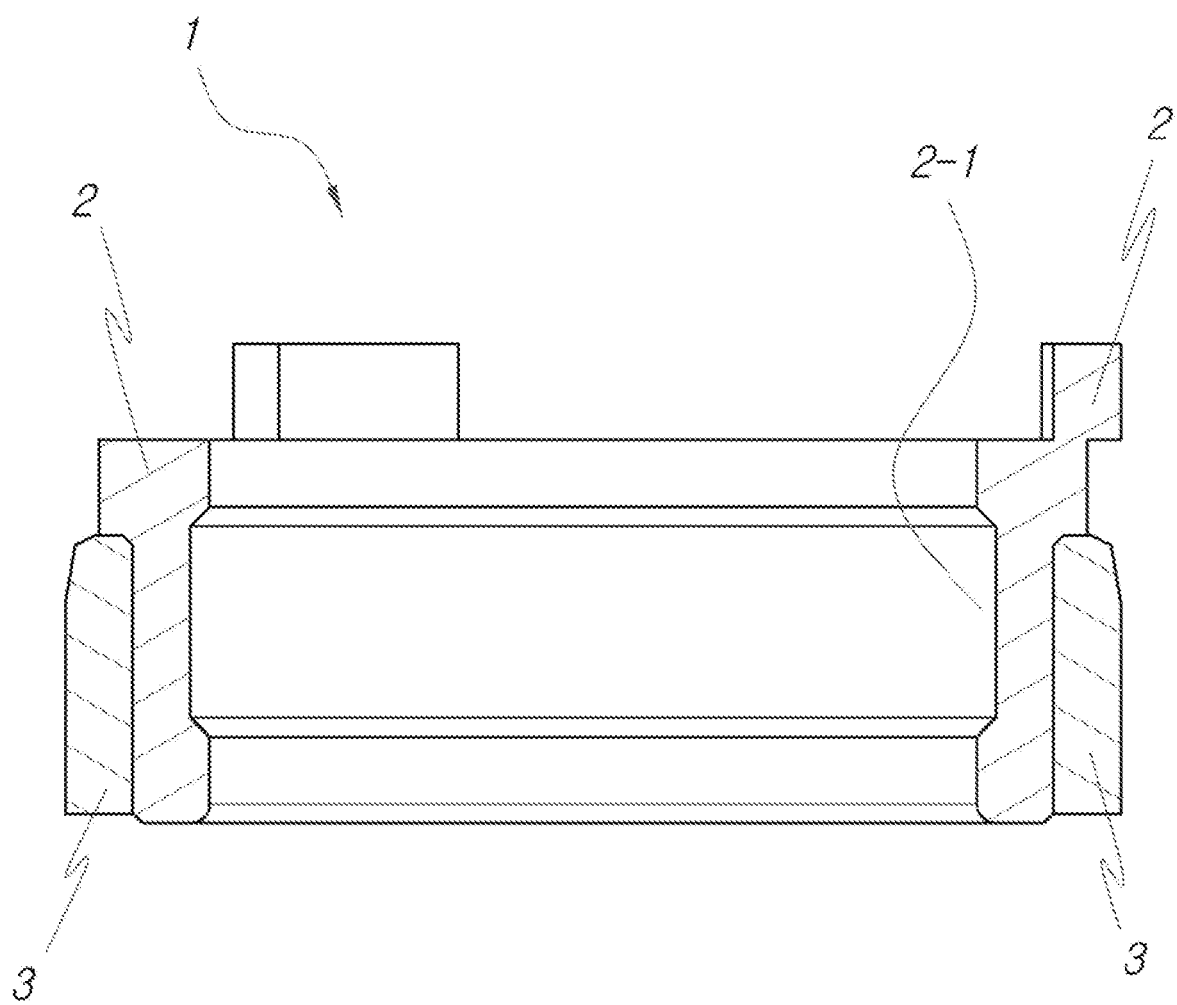
FIG. 2 is a sectional view showing the inner plunger according to the present invention.
Figure 3:
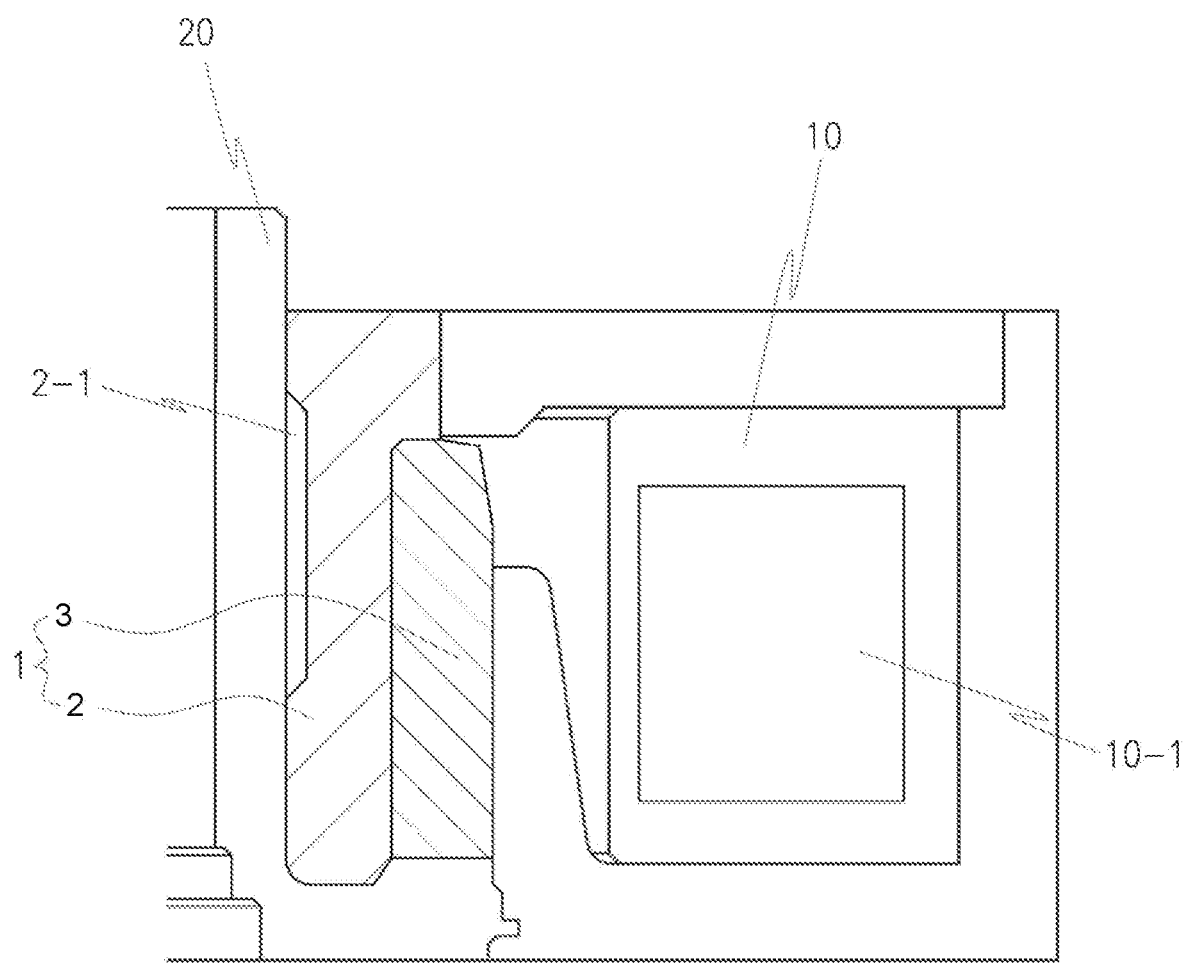
FIG. 3 is a partially sectional view showing a state where the inner plunger according to the present invention is installed.

Referring to FIGS. 1 to 3, an inner plunger 1 of a solenoid assembly for a clutch according to the present invention includes: an outer wheel 3 constituting the solenoid assembly and combined with a coil bobbin 10 to form an electromagnetic force; and an inner wheel 2 united with the outer wheel and combined with an inner housing 20. The inner plunger reciprocates inside the inner housing 20 by the electromagnetic force formed by the coil bobbin 10.

The inner wheel 2 of the inner plunger 1 is molded with insulator synthetic resin with excellent moldability, and the outer wheel 3 made of magnetic metal is inserted into the outer circumferential surface of the inner wheel 2 made of synthetic resin as described above.

An undercut groove 2-1 is formed in the whole inner surface of the inner wheel 2 in order to reduce friction against the inner housing when the inner wheel 2 made of synthetic resin performs a reciprocating action along the inner housing 20.

The unexplained reference numeral 10-1 designates a coil.

A manufacturing method of the inner plunger of the solenoid assembly for the clutch according to the present invention is achieved by a mold and an insert molding.

Figure 4:
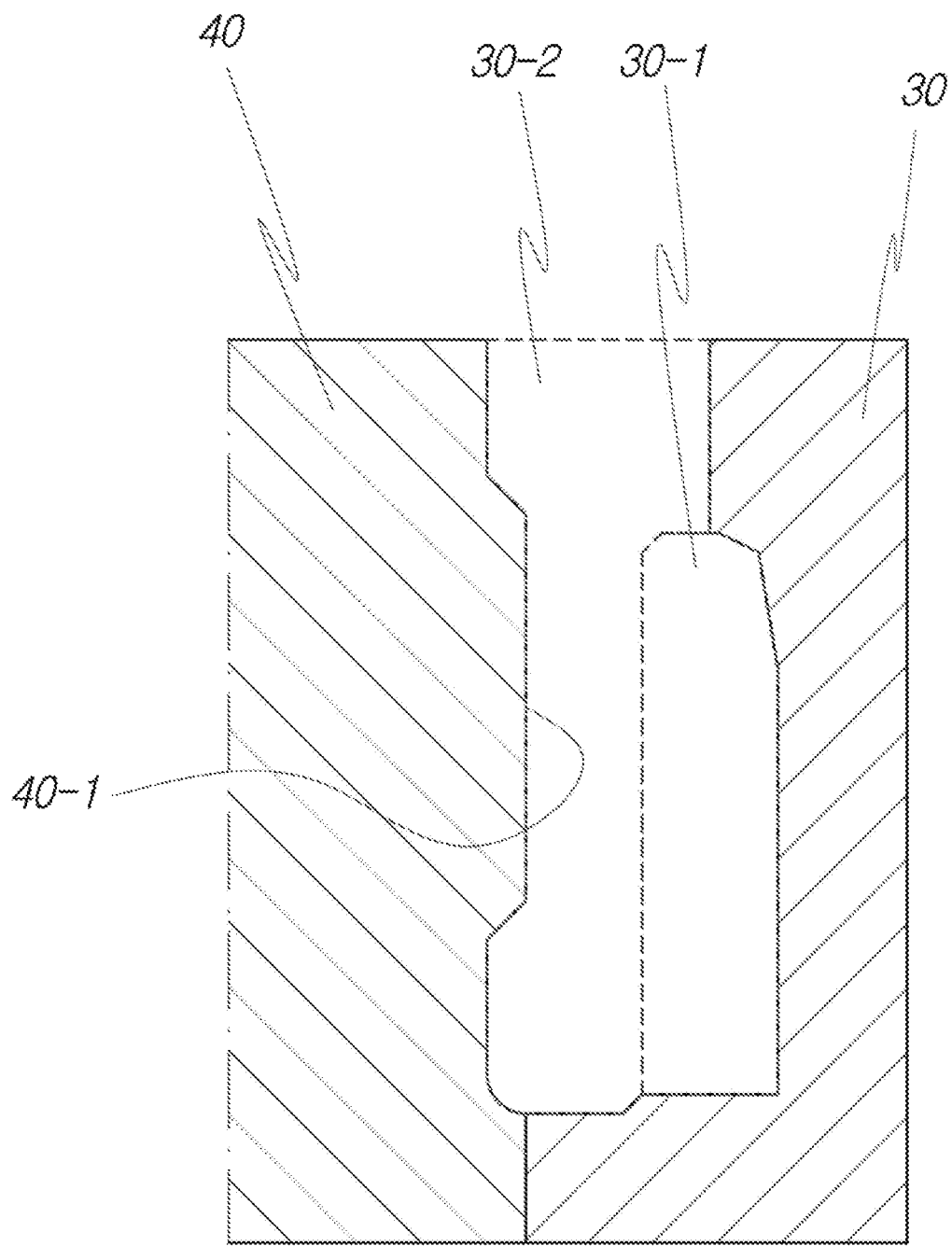
FIG. 4 is a partially sectional view of a mold for manufacturing the inner plunger according to the present invention.
Figure 5:
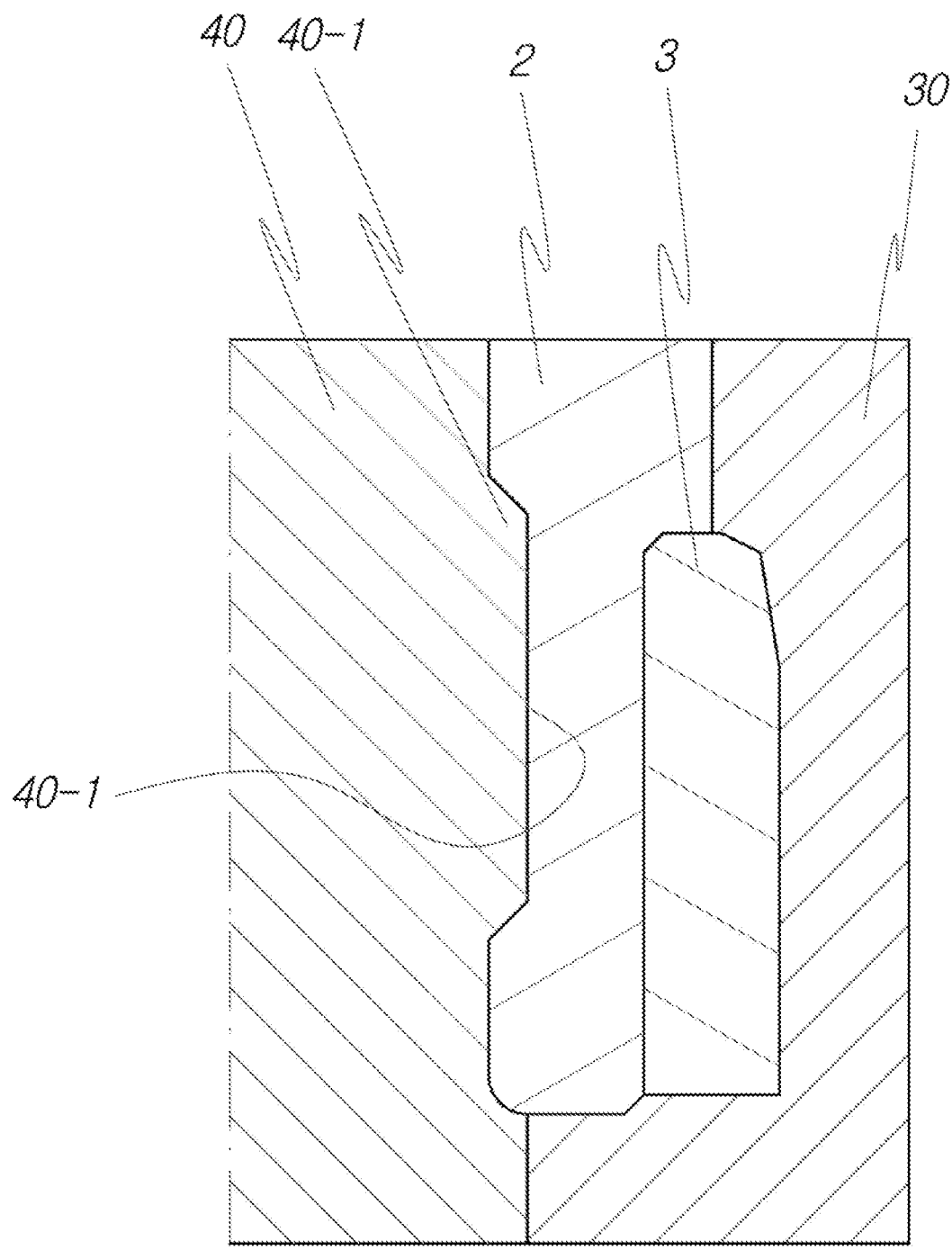
FIG. 5 is a partially sectional view showing a state where the inner plunger according to the present invention is molded.

Referring to FIGS. 4 and 5, the mold for insert molding of the inner plunger will be described.

The mold includes: a mold 30 having a space 30-1 for inserting the outer wheel 3 of the inner plunger and a space 30-2 for forming the inner wheel 2; and a core 40 having an undercut molding part 40-1 through which an undercut groove 2-1 is formed on the whole inner surface of the inner wheel 2 in order to reduce friction against the inner housing.

After that, the inner plunger is insert-molded in the mold 30.

First, in the mold 30, an outer wheel made of magnetic metal is put in the space 30-1 for inserting an outer wheel 3 of the inner plunger. The core 40 having the undercut molding part 40-1 is combined with the middle of the mold 30, and injection molding of nonmagnetic synthetic resin is performed to form an inner wheel 2. After that, the mold is removed. Then, the inner plunger 1 is manufactured.

Now, actions of the inner plunger of the solenoid assembly for the differential clutch of the vehicle according to the present invention will be described in detail as follows.

First, basic actions of the solenoid assembly for the differential clutch of the vehicle will be described.

The solenoid assembly is combined with the inner housing 20 of the differential of the vehicle. If it is necessary to actuate the differential, electricity is provided to the coil bobbin 10 to form an electromagnetic force.

Then, the inner plunger 1 moves along the inner housing 20 by the electromagnetic force by a magnetic field generate from the coil bobbin 10.

The above action is a general action of the solenoid assembly for the differential clutch of the vehicle. So, detailed description on the action of the solenoid assembly will be omitted, but only the actions of the components of the inner plunger will be described.

First, when the inner plunger 1 moves along the inner housing 20 by the electromagnetic force by the magnetic field generate from the coil bobbin 10, since the inner wheel 2 of the inner plunger 1 is less influenced by the electromagnetic force since being made of synthetic resin, responsibility is improved, and it helps the action that the inner plunger 1 moves along the inner housing 20.

Especially, since the undercut groove 2-1 is formed on the whole inner surface of the inner wheel 2 more simply while the inner wheel 2 is formed with the nonmagnetic synthetic resin, the inner plunger can reduce friction against the inner housing 20 when reciprocating along the inner housing 20, so that the inner plunger is free from frictional resistance and facilitates the reciprocating action along the inner housing 20.

Moreover, the inner plunger can provide various shapes due to its excellent moldability since the inner wheel 2 is made of nonmagnetic synthetic resin. Therefore, the inner plunger can improve its function and productivity according to shapes of the inner plunger.

Because the magnetic metal as the outer wheel is inserted into the outer circumferential surface of the inner wheel 2 of the inner plunger, the inner wheel 2 and the outer wheel 3 can keep their shapes for a long time without separation from each other.

Additionally, because the magnetic metal inserted into the outer circumferential surface of the inner wheel 2 of the inner plunger forms the outer wheel 3, it prevents a loss of the electromagnetic force generated from the coil bobbin 10, so that the inner plunger can act smoothly.

What is claimed is:

1. A manufacturing method of an inner plunger of a solenoid assembly for a differential clutch of a vehicle comprising the steps of:
    preparing a mold, which has a space for inserting an outer ring of the inner plunger and a space for forming an inner ring, and a core, which has an undercut molding part for forming an undercut groove on a whole inner surface of the inner ring in order to reduce friction against an inner housing; and
    putting an outer wheel made of magnetic metal in the space of the mold for inserting the outer ring of the inner plunger, combining the core having the undercut molding part with a middle of the mold, forming the inner ring with nonmagnetic synthetic resin by injection of synthetic resin, and removing the mold.

2. The manufacturing method of claim 1, wherein the inner ring is formed with nonmagnetic synthetic resin that is moldable in order to vary the shape of the inner plunger and to reduce weight.

* * * * *